United States Patent Office 3,542,870
Patented Nov. 24, 1970

3,542,870
1 - (3,5 - DIHALO - 4 - HYDROXY - PHENYL) - 2 - (2-ARYLOXY OR 2 - ARYLALKYL - ISOPROPYLAMINO)-PROPANOLS
Jean Pierre Fourneau and Jean Maurice René Alfred Delourme, Paris, France, assignors to Laboratoires Houde, Paris, France, a French body corporate
No Drawing. Filed Jan. 2, 1968, Ser. No. 694,818
Claims priority, application France, Jan. 10, 1967, 90,478; Dec. 21, 1967, 133,258
Int. Cl. C07c 91/16, 93/06
U.S. Cl. 260—570.6                 4 Claims

ABSTRACT OF THE DISCLOSURE

The invention has for its object new compounds of formula

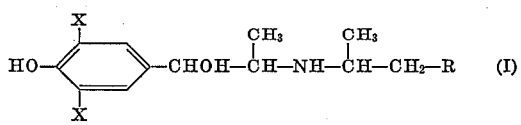

wherein X is a bromine or iodine atom and R is a phenoxy or benzyl group having hypotensive and peripheral vasodilator activity.

---

The present invention has for its object new compounds of formula:

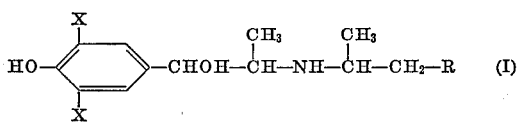

wherein X is a bromine or iodine atom and R is a phenoxy or benzyl group and their inorganic or organic acid addition salts.

For preparing, the compounds of Formula I above, one mole of a compound of formula:

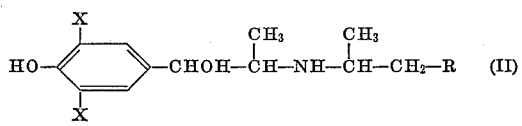

wherein R has the above defined meaning, is reacted with an halogenating agent in an amount sufficient to provide the 4 bromine or iodine atoms required for the reaction.

The compound of Formula II may be used in the process either as the base, or as a salt, especially with an inorganic acid, and particularly the hydrochloride.

Examples of halogenating agents are bromine in the presence of acetic acid, and iodine in the presence of ammonia or of a primary aliphatic amine such as methylamine, ethylamine or ethylenediamine, in aqueous solution in the presence of potassium or sodium iodide, or in methanol or ethanol solution.

Generally, the halogenating agent solution is added dropwise, with constant stirring, at room temperature, to the 1-(4-hydroxy-phenyl)-2-(2-aryloxy or 2-arylalkyl-isopropylamino)propanol solution. The dihalogenated reaction product precipitates out. It is then suction filtered, and then washed and dried.

To obtain the acid addition salts, the base is reacted according to conventional techniques with an inorganic or organic acid. Included among such acid addition salts are particularly the hydrochloride, the hydrobromide, the tartrate, the citrate, and the like.

The aforesaid compounds of Formula I exhibit in particular hypotensive and peripheral vasodilating properties useful in human therapeutics.

Such compounds include in particular 1-(3,5-dibromo-4 - hydroxy-phenyl)-2-(1-methyl-3-phenyl-propylamino)-propanol or dibromobuphenine, 1-(3,5-diiodo-4-hydroxyphenyl) - 2 - (1-methyl-3-phenyl-propylamino)-propanol or diiodobuphenine and 1-(3,5-diiodo-4-hydroxy-phenyl)-2-(1-methyl-2-phenoxy-ethylamino)-propanol or diiodoisoxsuprine.

Some results of pharmacological tests carried out with the particular compounds listed above are given below for illustrative purposes, some of these tests having been carried out comparatively with buphenine and isoxsuprine, the known corresponding nonhalogenated compounds. Diiodobuphenine being water-insoluble, most tests concerning this compound were carried out with an aqueous suspension.

(I) TOXICITY

(A) Acute toxicity (a) The results obtained with dichlorobuphenine hydrochloride, dibromobuphenine hydrochloride and diiodobuphenine are given below in Table I together with the results obtained with buphenine hydrochloride (reference compound).

TABLE I

|  | Dibromobuphenine, HCl, mg./kg. | Diiodobuphenine, mg./kg. | Buphenine, HCl, mg./kg. |
|---|---|---|---|
| Slow i.v. perfusion in rat | 67.7 |  | 37.4 |
| Rapid i.v. injection in mice | 24 |  | 39 |
| Intraperitoneally, in mice |  | [1] >600 | 100 |
| Orally, in mice | [1] >600 | [2] >2 | 330 |

[1] No fatal issue.
[2] Grams per kilogram (no fatal issue).

From this table it may be concluded that, on veinous administration, buphenine and dibromobuphenine have a toxicity of the same order. By the digestive route, the acute toxicity of dibromobuphenine and of diiodobuphenine is extremely low, and the minimum lethal dose could not be determined. This is also the case with diiodobuphenine on intraperitoneal administration. The toxicity of both these compounds is much lower than that of buphenine.

(b) The acute toxicity ($LD_{50}$) of diiodoisoxsuprine in mice, the product being administered as a gum suspension, is higher than 600 mg./kg. (no fatal issue) intraperitoneally and higher than 1 g./kg. per os (no fatal issue). The minimum lethal dose could not be determined. The toxicity of diiodoisoxsuprine is much lower than that of isoxsuprine which is 250 mg./kg. and 600 mg./kg., respectively.

(B) Subacute toxicity—tolerance

Diiodobuphenine was administered orally at increasing dosages to rats and dogs:

(a) 20 rats (10 male and 10 female) were given daily the following dosages:

25 mg./kg. during 3 days,
50 mg./kg. during the 3 following days,
100 mg./kg. during the 3 following days.

Twelve rats were used as reference animals. During this experimentation, of 11-day duration, there was noted no particular symptomatology, no fatal issue and no change in the weight increase curve with reference to the controls.

(b) 3 male dogs were given daily the following dosages:

25 mg./kg. during 3 days,
50 mg./kg. during the 3 following days,
75 mg./kg. during the 3 following days.

There was noted no particular symptomatology during the first 6 days of treatment (25 and 50 mg./kg. daily). When the daily dosage was increased to 75 mg./kg., one of the 3 dogs, which had lost 1.500 kg. in weight during the first 6 days, showed highly marked signs of dyspnea and inappetence and died on the 9th day; autopsy of this animal showed an irritation of the gastro-duodenal mucosa and slight pulmonary congestion. No symptoms were evidenced by the other two animals; one of them retained its original weight, the other retained it during the first 6 days, and then lost 1 kg.

(II) SYSTEMIC EFFECTS

The following tests were carried out with diiodobuphenine.

1°/Heart in situ (rat)—20 to 60 mg./kg. of diiodobuphenine, intraduodenally or intraperitoneally have no significant effect on heart contractions or on inhibitory effects.

2°/Respiration (rat)—10 to 50 mg./kg. of diiodobuphenine, by the intraduodenal route, have no substantial effect on respiratory amplitude or rhythm.

3°/Intestine in situ (Guinea-pig)—50 and 100 mg./kg. of diiodobuphenine, per os, do not modify intestinal peristalsis in Guinea-pig.

(III) EFFECTS ON BLOOD PRESSURE (A) Tests carried out with diiodobuphenine

1°/The effects of diiodobuphenine and of buphenine on blood pressure were observed in anesthetized rats and in waking rabbits:

(a) Anesthetized *rats* (carotid pressure):

(1) Administered in suspension form by the intraduodenal route, equimolecular doses of 8.2 mg./kg. of diiodobuphenine and of 5 mg./kg. of buphenine hydrochloride cause a durable hypotension of 2–4 cm. of Hg. The intensity and duration of this hypotension are comparable for both products. Both have similar adrenolytic effects.

(2) Administered as an 0.4% base solution in an aqueous 8% tartaric acid solution, by the intravenous route, the respective equimolecular dosages of 250 and 500 µg./kg. of diiodobuphenine and of 135 and 270 µg./kg. of buphenine produce first a substantial hypotension (3–6 cm. of Hg) which lasts several minutes, followed by a highly durable secondary hypotension of 2–3 cm. of Hg. Here, again, the effects are similar. This is also the case when the products are administered by slow perfusion.

(b) Waking *rabbit* (femoral pressure):

Equimolecular dosages of 4 mg./kg. of diiodobuphenine and of 2.2 mg./kg. of buphenine, as 0.4% solutions in a 3% tartaric acid solution were administered by the i.v. route to 3 rabbits, 3 days running, the administrations being effected by turns, in the following manner:

|  | Rabbit No. 1 | No. 2 | No. 3 |
|---|---|---|---|
| 1st day | Diiodobuphenine | Buphenine | Buphenine. |
| 2d day | Buphenine | Diiodobuphenine | Diiodobuphenine. |
| 3d day | Diiodobuphenine | Buphenine | Buphenine. |

The hypotensions observed following the injections of both materials are equivalent both in intensity and in duration: on an average, 4 cm. of Hg during at least 3 hours.

To conclude, the hypotensive activity of diiodobuphenine is equivalent to that of buphenine at equimolecular dosages.

2°/Blood pressure in waking rat (Giono-Chevillard apparatus):

1st test.—100 mg./kg. of diiodobuphenine per os cause a maximum decrease of 2–3 cm. in average and maximum pressures, such decreases appearing with some delay (about 50 min. after treatment) and being maintained for a long time.

2nd test.—The tests were renewed, on oral administration of a dosage of 200 mg./kg. of the product. The resulting hypotension was not higher than that resulting after oral administration of 100 mg./kg.

3°/Blood pressure in rat suffering from high blood pressure (single administration): The hypertension was caused by ablation of a kidney and constriction of the other in a collodion capsule. Results:

| Rat. No.: | Dosage per os, mg./kg. | Blood pressure prior to treatment | Blood pressure after administration of diiodobuphenine and at its maximum action |
|---|---|---|---|
| 1 | 100 | 15–19 | 10–13 |
| 2 |  | 16–20 | 11–15 |
| 3 |  | 14–19 | 9–13 |
| 4 |  | 13–18 | 9–13 |
| 5 | 200 | 17–20 | 10–13 |
| 6 |  | 17–21 | 10–13 |

The action sets in slowly, reaches its maximum level about 1 hour after intubation and persists during at least three hours. 19 hours later, blood pressure has reverted to its original value.

4°/Blood pressure in rat suffering from high blood pressure (repeated administrations). 3 rats suffering from high blood pressure due to renal constriction are given per os 100 mg./kg. daily of diiodobuphenine during five consecutive days. Blood pressure is measured in the waking animal by means of the Giono-Chevillard apparatus. Results are as follows: (B.P.=blood pressure)

|  | Rat No. 4 | Rat No. 8 | Rat No. 12 |
|---|---|---|---|
| 1st day: |  |  |  |
| B.P. prior to treatment | 13–19 | 18–25 | 12–17 |
| B.P., minimum, after administration | 10–15 | 11–15 | 8–12 |
| 2d day: |  |  |  |
| B.P. prior to treatment | 10.5–13 | 17–24 | 12–19 |
| B.P., minimum, after administration | 7–12 | 14.5–21 | 10–13 |
| 3d day: |  |  |  |
| B.P. prior to treatment | 11–15 | 16–23 | 12–17 |
| B.P., minimum, after administration | 11–15 | 15–22 | 11–18 |
| 4th day: |  |  |  |
| B.P. prior to treatment | 11–14 | 15.5–21 | 12.5–17.5 |
| B.P., minimum, after administration | 10–14 | 13–20 | 11–16 |
| 5th day: |  |  |  |
| B.P. prior to treatment | 10–14 | 16–22 | 11.5–16 |
| B.P., minimum, after administration | 10–14 | 12–18 | 11.5–15 |

The hypotensive action of diiodobuphenine became nil on 3rd administration. However, at the end of the experiment, the blood pressure of rat No. 4 never came up to its original value after treatment, and there is again noted a good effect of the product on the 5th day in rat No. 8.

(B) Tests carried out with dibromobuphenine

The effects of dibromobuphenine, administered by the intravenous route, on the carotid blood pressure, were observed in anesthetized Guinea-pig and the results are set forth in Table II below:

TABLE II

| | dibromobuphenine, HBr | Buphenine-HCl (control) |
|---|---|---|
| Doses (=0.75 mmol./kg., mg./kg | 0.4 | 0.25 |
| Blood pressure decrease, mm. of Hg | 41 | 38 |
| Duration of hypotension, mn | 11 | 7 |
| Doses (=1.5 mmol./kg.), mg./kg | 0.8 | 0.5 |
| Blood pressure decrease, mm. of Hg | 41 | 39 |
| Duration of hypotension, mn | 24 | 25.2 |

The above results show that this compound has a marked hypotensive activity, of the same order as that of buphenine.

(C) Tests carried out with diiodoisoxsuprine

The effects of diiodoisoxsuprine on blood pressure were observed in anesthetized rat, at the level of the carotid; the product was administered as intraduodenal injections, suspended in a gum syrup.

A dosage of 3.27 mg./kg. of diiodoisoxuprine decreased blood pressure by 5 and 1.5 cm. of Hg, in a durable manner. Thus, this compound shows a marked hypotensive activity, of the same order as that of isoxsuprine, at equimolecular dosages. Under the same conditions, the latter gives durable hypotensions of 2, 3 and 3.5 cm. of Hg.

(IV) PERIPHERAL VASODILATING ACTION

The vasodilating effects were measured by the temperature increase of the ear of waking rabbits and Guinea-pigs. The test product was diiodobuphenine.

(a) Waking rabbit.—The cutaneous thermometric measurements were carried out simultaneously with the blood pressure measurements at the level of the *A. femoralis* in the above tests (i.v. administration of 4 mg./kg. of diiodobuphenine and 2.2 mg./kg. of buphenine, in tartaric acid solution). The injection of diiobuphenine causes a temperature increase of 8–10° in the ear, while the equimolecular buphenine dosage increases the temperature only by about 5°.

(b) Waking Guinea-pig.—When administered per os to 4 animals, as a suspension in a gum syrup, at the dosage of 150 mg./kg., diiodobuphenine increases the temperature of the ear by, respectively:

6.5° during more than 2 hrs. and 30 mn.
8° during more than 1 hr.
12° during more than 6 hrs.
10° during more than 5 hrs.

When administered under the same conditions at dosages of up to 200 mg./kg. (2.5 times the equimolecular dosage), buphenine has no effect on skin temperature.

To conclude, the vasodilator activity of diiodobuphenine is markedly higher than that of buphenine.

(V) ACTION ON THE HYPERTENSIVE EFFECTS OF (a) Noradrenalin (rat).—The hypertension produced by 0.4 µg of noradrenalin, i.v., which reached 3.2 cm. of Hg, is decreased by 1 cm. after 10 mg./kg. of diiodobuphenine, by the i.d. route.

(b) DMPP (1,1-dimethyl-4-phenylpiperazinium iodide).—10 mg./kg. i.d., of diiodobuphenine decrease by a maximum of 80% the hypertension caused by DMPP (40 µg./kg.).

(c) Tyramine.—10 mg./kg., i.d., of diiodobuphenine modify only unsignificantly the hypertension produced by 250 µg./kg. of tyramine.

(d) Stimulation of the splanchnic nerve (rat).—This stimulation produces a hypertension of sympathetic origin, 20 mg./kg. of diiodobuphenine, i.p., decrease greatly this hypertension.

The compounds of Formula I are advantageously used in human therapeutics for the treatment of all forms of high blood pressure conditions and as peripheral vasodilators.

Thus, the invention contemplates also a therapeutical composition containing, as active ingredient, a compound of Formula I, or a therapeutically administrable acid-addition salt thereof, and a pharmeutically acceptable vehicle.

The composition according to the invention is administrable by the oral, rectal or topical routes.

The usual daily dosage regimen is 5–200 mg. of active principle per 24 hours by the oral or rectal routes. For these purposes, the composition is formulated in dosage unit forms containing each 5–200 mg. of active ingredient associated with an usual suitable vehicle or excipient. By the topical route, when used as peripheral vasodilator, several applications may be made per 24 hours.

Pharmaceutical forms of compounds of Formula I are set forth for illustrative nonlimiting purposes.

(1) Enteric coated tablets

Core:
    Dibromobuphenine hydrochloride—15 mg.
    Starch, lactose, talc and magnesium stearate—q.s.
Coating:
    Cellulose acetophthalate, q.s., for a tablet finished at about 0.25 g.

(2) Enteric coated tablets

Core:
    Diiodoisoxsuprine—7.5 mg.
    Starch, lactose, talc and magnesium stearate—q.s.
Coating:
    Mixture of polymethacrylates, q.s., for a tablet finished at about 0.25 g.

(3) Enteric coated tablets

Core:
    Diiodobuphenine—10 mg.
    Starch, lactose, talc and magnesium stearate—q.s.
Coating:
    Mixture of polymethacrylates, q.s., for a tablet finished at about 0.25 g.

(4) Tablets

Diiodobuphenine—25 mg.
Excipient: starch, lactose, talc and magnesium stearate, q.s., for a tablet finished at about 0.25 g.

(5) Suppositories

Dibromobuphenine—50 mg.
Excipient: semisynthetic glycerides, q.s., for a suppository finished at about 2 g.

(6) Suppositories

Diiodoisoxsuprine—20 mg.
Excipient: semisynthetic glycerides, q.s., for a suppository finished at about 2 g.

(7) Suppositories

Diiodobuphenine—50 mg.
Excipient: semisynthetic glycerides, q.s., for a suppository finished at about 2 g.

(8) Ointment

Containing 1%, by weight, of dibromobuphenine with an usual ointment excipient.

(9) Ointment

Containing 2%, by weight of diiodobuphenine with an usual ointment excipient.

To illustrate the usefulness of compounds of Formula I in human therapeutics and especially in the treatment of high blood pressure conditions, the results of clinical tests carried out using diiodobuphenine as typical compound of the family are set forth below.

Diiodobuphenine, in the form of tablets containing 50 mg. of active principle, was first administered to 5 aged female patients whose blood pressure was in excess of 20 in spite of a treatment with various hypotensive drugs. Drastic improvements resulted, as may be seen below.

Case report No. 1.—78-year-old female patient suffering from a simple high blood pressure condition, without visceral involvement.

Blood pressure is at 20½ prior to treatment, in spite of ment, in spite of a regular former treatment with conventional hypotensive drugs. B.P. was measured morning and evening.

| | |
|---|---|
| 1st day (2 tablets; 1 morning, 1 evening) | 18½—17½ |
| 2nd day (2 tablets; 1 morning, 1 evening) | 15—13½ |
| 3rd day (2 tablets; 1 morning, 1 evening) | 15—15½ |
| 4th day (2 tablets; 1 morning, 1 evening) | 15½—15½ |
| 5th day (2 tablets; 1 morning, 1 evening) | 14—13 |
| 6th day (2 tablets; 1 morning, 1 evening) | 14—14 |
| 7th day (2 tablets; 1 morning, 1 evening) | 14—14 |
| 8th day (2 tablets; 1 morning, 1 evening) | 14—12 |
| 9th day (1 tablet: ½ morning, ½ evening) | 12—12 |
| 10th day (1 tablet: ½ morning, ½ evening) | 12—12½ |
| 11th day (1 tablet: ½ morning, ½ evening) | 12—12 |

No mishap—no intolerance.

Blood picture: prior to treatment and on the 10th day—unchanged.

Stable azotemia: 0.35 prior to treatment; 0.33 on the 10th day.

Case report No. 2.—81-year-old female, suffering from high blood pressure for over 20 years, which developed a transient left hemiparesis and suffering from bilateral deafness due to otosclerosis.

Blood pressure is at 10½ prior to treatment, in spite of a regular former treatment with conventional hypotensive drugs. Blood pressure determinations are made morning and evening:

| | |
|---|---|
| 1st day (2 tablets) | 19—19½ |
| 2nd day (2 tablets) | 18—16½ |
| 3rd day (2 tablets) | 17—17 |
| 4th day (2 tablets) | 18—19 |
| 5th day (2 tablets) | 16½—17 |
| 6th day (2 tablets) | 15—15 |
| 7th day (2 tablets) | 15—15 |
| 8th day (2 tablets) | 15—15 |
| 9th day (2 tablets) | 15—13½ |
| 10th day (1 tablet: ½ morning, ½ evening) | 14—13½ |
| 11th day (1 tablet: ½ morning, ½ evening) | 13—12½ |
| 12th day (1 tablet: ½ morning, ½ evening) | 12½—13 |

No mishaps—no intolerance.
Unchanged blood picture.
Azotemia: 0.40 prior to treatment, 0.45 after 10 days.

Case reports No. 3–5.—These three case reports are comparable to those previously described: 3 female patients more than 70 years old whose blood pressure is in excess of 20 in spite of hypotensive drugs. Blood pressure drops gradually *as early as the 1st day* and becomes stabilized between 16 and 13 and is maintained at that value with a single daily tablet of the drug according to the invention.

The following case reports illustrate other cases of high blood pressure conditions treated with diiodobuphenine (tablets containing 25 mg. of active principle).

Case report No. 6.—Mrs. C . . . , 64-year-old. Meningeal hemorrhage, treated symptomatically.

Blood pressure on admission: 20½.

After satisfactory systemic recovery without significant sequelae, treatment of HBP (High Blood Pressure) with diiodobuphenine is begun: 2 tablets per day.

Gradual improvement of the pressure values that are determined daily, especially of the minimum value which becomes stabilized at about 8/9. Total duration of treatment: 15 days.

Case report No. 7.—Mrs. G . . . , Andrée, 58-year-old. Admitted into the service for a general checkup of a HBP condition which has been known for some years. Various subjective complaints: frontal headaches—asthenia—palpitations. B.P.: 20/11.

No organic cause may be found.

Retinal pressure: 60

Treatment with diiodobuphenine at the rate of 2 tablets daily: most satisfactory gradual improvement of the pressure values.

At the beginning of the treatment, after 6 days of complete rest: B.P.: 19/11 1/4; 2nd day: 18/10; 4th day: 19/9; 6th day: 17/8.5; and these values are maintained throughout the time the patient is in the hospital.

Total duration of treatment: 12 days.

Case report No. 8.—Mrs. T . . . , Maryse, 50-year-old. HBP at 20/12 with minimum retinal blood pressure (MRBP) at 55, discovered during a general checkup for asthenia.

Biological balance without significant anomaly.

2 tablets daily of diiodobuphenine during the 12 days the patient spends in the hospital.

As early as the 3rd day: B.P.: 18/10, and then 17/9, the next day, the values are maintained at this level, in particular with a minimum value of less than 10.

Case report No. 9.—Mrs. I . . . , Marie, 71-year-old. Sent to the hospital for myocardial infarct. HBP already known for about 5 years: the values oscillate permanently between 18 and 20 (maximum) and 10.5–12 (minimum).

Attempted treatment with 2 tablets per day of diodobuphenine gives hopeful results: the blood pressure values are verified daily and show marked improvement of the HBP; the minimum value, in particular, remains constantly between 8 and 9.

Case report No. 10.—Mrs. Q . . . . , Andrée, 68-year-old. Sequela of right hemiplegia which occurred 6 months previously due to a pressure increase to 21/14.

Since then the values were maintained at about 20/12.

Beginning of diffuse cerebral sclerosis.

2 tablets daily of diiodubuphenine during 15 days.

Good overall result with respect to the regularly controlled values; maximum between 16 and 18, minimum between 8 and 10.

Case report No. 11.—Mrs. E . . . , Paule, 67-year-old. HBP known for a number of years; the values are usually at about 19/20 (maximum) and 11/12 (minimum).

Hard arteries—basal systolic couffle—frequent headaches.

2 tablets daily of diiodobuphenine. After 10 days of treatment, the patient observes that systemic balance has improved.

The B.P. values are improved: 16/17 (maximum), 8–9 (minimum).

The treatment is continued for a further three weeks with the same favourable result.

Case report No. 12.—Mrs.. F . . . , Andrée, 60-year-old. Plethoric diabetic, suffering from high blood pressure at 20/12. Diabetes is balanced by means of a glucide-free diet in association with abiguanide.

With respect to HBP, diiodobuphenine is prescribed at the rate of 2 tablets daily. The values are gradually improved, as early as the 3rd day the minimum value is at 10.

On the 6th day; minimum value at about 8.5.

The good result thus obtained is maintained on continued treatment with the drug.

Case report No. 13.—Mrs. B . . . , 70-year-old. Myocardial infarct 5 years previously; retains a left ventricular deficiency, adequately balanced with Digitalin and diuretics.

HBP at 19/11—MRBP: 55

The patient is treated with 2 tablets daily of diiodobuphenine. Good results: the pressure values decrease under favourable conditions: 18/10 the 3rd day, 17/9.5 the 6th day, and 17/8.5 the 10th day.

Case report No. 14.—Mrs. R . . . , Charlotte, 60-year-old. HBP known for the past 5 years, already submitted to various therapeutical treatments. Admitted into the service for a general checkup. MRBP at 55.

After 4 days of complete rest: 20/11.5.

Diiodobuphenine: 2 tablets daily.

As early as the 3rd day: B.P. 18/10; on the 5th day, B.P. 17.5/9, on the 10th day, B.P. 17/8.5.

Very good systemic feeling. The patient asks to continue the treatment in an ambulatory manner.

Case report No. 15.—Mrs. B . . . , Marie, 72-year-old. HBP at 19/11 on admission to the hospital for chronic pneumonopathy.

Two tablets daily of diiodobuphenine. Very good results as early as the 3rd day: minimum B.P. is at 9, maximum at 17.5; on the 6th day, B.P.: 17/8.5.

After 15 days in the hospital, the patient goes home with a B.P. of the order of 17/8.5.

These results show that diiodobuphenine possesses undeniable hypotensive properties in a great many cases of high blood pressure conditions (more than 75% of good results on the overall number of cases treated). Tolerance of the product is outstanding and doubtless the most important fact is the provision of a product which is both efficient and entirely safe.

The following nonlimiting examples are given to illustrate the invention.

EXAMPLE I

Preparation of 1-(3,5-dibromo-4-hydroxy-phenyl)-2 - (1-methyl-3-phenylpropylamino)-propanol (X=Br;

R=—CH$_2$—C$_6$H$_5$)

(dibromobuphenine)

15 g. of buphenine are dissolved in 200 ml. of glacial acetic acid, with gentle heating. After cooling, a solution of 5.1 ml. of bromine in 500 ml. of glacial acetic acid is added dropwise, with constant stirring. The resulting precipitate is suction filtered and washed with ether; the material consists of dibromobuphenine hydrobromide (19.1 g.). The dibromobuphenine base is released by stirring during several hours with 200 ml. of 2 N potassium bicarbonate solution and 600 ml. of ether. The base is suction filtered, washed with water and ether, and is desiccated in the vacuum exsiccator. 12.9 g. of dibromobuphenine melting at 192–193° C. are obtained. The hydrochloride has a melting point of 220° C.

EXAMPLE II

Preparation of 1-(4-hydroxy-3,5-diiodo-phenyl)-2 - (1-methyl-2-phenoxy-ethylamino)-propanol (X=I; R=phenoxy)

diiodoisoxsuprine)

(A) By iodination in ammonia medium.—A solution of 17.15 g. (0.0675 mol) of iodine in 450 ml. of 95° alcohol is added dropwise to a suspension of 10 g. (0.03 mol) of isoxsuprine [2-(1-methyl-2-phenoxy-ethylamino) propanol]hydrochloride in a mixture of 130 ml. of water and of 210 ml. of concentrated ammonia (22° Bé). During this addition, the isoxsuprine dissolves little by little giving a perfectly clear solution, a white diiodoisoxsuprine precipitate then appears. After suction filtering and washing with water, with ethyl alcohol and finally with ether, 9.5 g. of diiodoisoxsuprine (yield 57%) are obtained, which melts at 195–198° C. (capillary tube) with decomposition.

(B) By iodination in the presence of ethylenediamine.—A solution of 0.22 mole of iodine containing potassium iodide is added portionwise, with constant stirring and waiting for complete disappearance of the colour prior to each addition, to a solution of 0.1 mole of isoxsuprine in a 60% solution of 0.05 mole of ethylenediamine, eventually adding about 10 ml. of alcohol to obtain a homogeneous mixture. After 2 hours of contact at the laboratory temperature, the separated product is purified by crystallization.

(C) By iodination in the presence of ethylamine.—A solution of 1.25 mole of iodine and 400 g. of sodium iodide in 1.3 litres of water is added dropwise, with mechanical stirring, to the solution of 0.56 mole of isoxsuprine in 1 litre of aqueous 20% ethylamine solution. When the addition is complete, stirring is continued for a further 30 min. The di-iodinated product precipitates out. It is washed and purified as previously described.

EXAMPLE III

Preparation of 1-(3,5-diiodo-4-hydroxy-phenyl)-2 - (1-methyl-3-phenyl-propylamino)-propanol (X=I;

R=CH$_2$C$_6$H$_5$)

24 g. of buphenine hydrochloride are suspended in a mixture of 440 ml. of 34% ammonia (specific gravity=0.89) and 315 ml. of water. 41 g. of iodine dissolved in 1080 ml. of 96% alcohol are added little by little, with good stirring. During this addition, effected in about 30 min., buphenine hydrochloride dissolves fairly rapidly and then the diiodobuphenine precipitates out as a crystalline powder. Stirring is continued for a further hour. The precipitate is suction filtered, and then washed with water, with alcohol and with ether and is finally dried in vacuo in the exsiccator in the presence of phosphoric anhydride. Thus, about 23 g. of diiodobuphenine solvated with 1 mole of ethanol are obtained in the form of a micro-crystalline white powder. M.P. (slow)=185° C. (dec.); M.P. (inst.): 212° C.

[ANALYSIS OF THE PRODUCT DESICCATED IN AN OVEN AT 75–80° C TO CONSTANT WEIGHT]

| | C, percent | H, percent | I, percent | N, percent |
|---|---|---|---|---|
| Found | 41.47 | 4.36 | 46.10 | 2.72 |
|  | 41.42 | 4.40 |  |  |
| Calculated, for C$_{19}$H$_{23}$I$_2$NO$_2$ | 41.40 | 4.20 | 46.05 | 2.54 |

Diiodobuphenine has the following solubility characteristics:

In water, ethanol, methanol, isopropanol, ether, benzene—insoluble.

In hot ethyl acetate, butanone, chloroform—very slightly soluble.

In hot pyridine, dimethylformamide, dimethylsulfoxide, dioxan—soluble.

In glacial acetic acid—most readily soluble.

For the preparation of diiodobuphenine, ammonia may be substituted with ethylene diamine or ethylamine, as indicated in Example III.

Having now described our invention what we claim as new and desire to secure by Letters Patent is:

1. Compounds of formula:

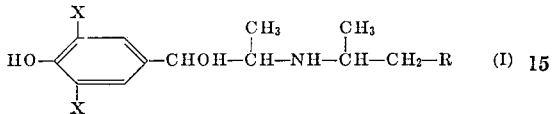

wherein X is a member selected from the group consisting of bromine and iodine and R is a group selected from phenoxy and benzyl, and their acid addition salts.

2. 1-(3,5-dibromo-4-hydroxy-phenyl)-2-(1-methyl-3-phenyl-propylamino)-propanol and its hydrochloride and its hydrobromide.

3. 1-(3,5-diiodo-4-hydroxy-phenyl)-2-(1-methyl-3-phenyl-propylamino)-propanol.

4. 1-(3,5-diiodo-4-hydroxy-phenyl)-2-(1-methyl-2-phenoxy-ethylamino)-propanol.

References Cited

UNITED STATES PATENTS

| | | | |
|---|---|---|---|
| 2,661,372 | 12/1953 | Schopf et al. | 260—570.6 |
| 3,056,836 | 10/1962 | Moed | 260—570.6 |
| 3,437,731 | 4/1969 | Schmitt et al. | 260—570.6 X |

FOREIGN PATENTS

| | | |
|---|---|---|
| 789,033 | 1/1958 | Great Britain. |
| 800,718 | 9/1958 | Great Britain. |
| 1,040,724 | 9/1966 | Great Britain. |
| 1,040,736 | 9/1966 | Great Britain. |

OTHER REFERENCES

Biel et al.: "Jour. Amer. Chem. Soc.," vol. 76, pp. 3149–53 (1954).

Rodd: "Chemistry of Carbon Compounds," vol. IIIA, pp. 438–40 (1954).

ROBERT V. HINES, Primary Examiner

U.S. Cl. X.R.

260—501.18; 424—330